(12) United States Patent
Fuchs (10) Patent No.: US 6,841,764 B2
(45) Date of Patent: Jan. 11, 2005

(54) DEVICE AND METHOD FOR KEEPING MEALS WARM

(75) Inventor: Christian Fuchs, Bülach (CH)

(73) Assignee: Inducs AG, Herisau (CH)

(*) Notice: Subject to any disclaimer, the term of this patent is extended or adjusted under 35 U.S.C. 154(b) by 88 days.

(21) Appl. No.: 10/094,332

(22) Filed: Mar. 8, 2002

(65) Prior Publication Data

US 2002/0125245 A1 Sep. 12, 2002

(30) Foreign Application Priority Data

Mar. 9, 2001  (CH) ............................................... 0442/01
Jul. 18, 2001  (CH) ............................................... 1336/01

(51) Int. Cl.[7] .............................................. H05B 6/12
(52) U.S. Cl. ..................................... 219/621; 219/622
(58) Field of Search ................................ 219/621, 622, 219/626, 620, 665, 627; 99/451; 340/572.1, 825.36, 825.37, 825.54; 126/9 R, 25 R, 39 R, 38

(56) References Cited

U.S. PATENT DOCUMENTS

| | | | |
|---|---|---|---|
| 3,742,174 A | * 6/1973 | Harden, Jr. | ................ 219/627 |
| 3,742,178 A | 6/1973 | Harnden, Jr. | |
| 4,348,571 A | * 9/1982 | Dills | ......................... 219/622 |
| 4,351,996 A | * 9/1982 | Kondo et al. | ............... 219/625 |
| 4,511,781 A | * 4/1985 | Tucker et al. | .............. 219/626 |
| 4,587,947 A | * 5/1986 | Tomita | ...................... 126/25 R |
| 4,646,711 A | * 3/1987 | Oliphant | .................... 126/9 R |
| 5,448,038 A | * 9/1995 | Kim | ........................... 219/627 |
| 6,021,774 A | * 2/2000 | Taplan et al. | ............. 126/39 R |
| 6,080,975 A | 6/2000 | Kuse et al. | |
| 6,320,169 B1 | * 11/2001 | Clothier | ..................... 219/626 |

FOREIGN PATENT DOCUMENTS

| | | |
|---|---|---|
| DE | 44 39 095 A1 | 5/1996 |
| EP | 0 635 225 A | 1/1995 |
| EP | 0 921 708 A | 6/1999 |
| EP | 1 037 508 A1 | 9/2000 |
| JP | 08243016 A * 9/1996 | ............ A47J/27/00 |

* cited by examiner

Primary Examiner—Quang T. Van
(74) Attorney, Agent, or Firm—Rankin, Hill, Porter & Clark LLP (57) ABSTRACT

A heat retention system for keeping meals warm by converting induced electromagnetic energy of arisen heat. The system contains a receptacle (5, 55, 103) with passive elements (3, 53) which, via a plate (9, 59, 209), are in active connection with active elements (2, 210). Sensors (16, 18, 56, 215) and an optimised control unit (212) regulate the temperature of the meals (8) located in the receptacle (5, 55, 103), so that these meals are not cooked and energy is supplied in a directed manner. Preferably, the heat retention system is configured as a heat retention device that has a modular construction and may be dismantled into individual modules (101, 102, 103, 104) and may be assembled of individual modules (101, 102, 103, 104). For this, the individual modules include fastening devices, (105–108, 126, 135, 138, 145–148, 155, 158), such as turnbuckles (155, 158) or positive-fit fastening means (105–108, 126, 135, 138, 145–148) that correspond to the fastening devices of further modules.

24 Claims, 7 Drawing Sheets

DEVICE AND METHOD FOR KEEPING MEALS WARM

BACKGROUND OF THE INVENTION

1. Field of the Invention

The invention relates to a device and to a method for keeping warm, serving and presenting meals.

2. Description of Related Art

In restaurants, hotels, cruise ships and in the wide field of the catering market in which meals are serves at a buffet, there exists the need to present the just prepared meals and at the same time to be able to keep these warm over as long a time as possible with hardly any loss in quality, specifically without cooking them.

From the state of the art there are known devices, so-called heat retention systems, which permit food to be kept warm. A largely widespread method in, for example, company personnel restaurants, is the heat retention of meals in a water bath. These methods have numerous disadvantages such as, for example, a very sluggish heating system, an energy supply which may not be controlled or is only very difficultly controllable, a complicated handling (e.g. refilling water, waiting until the water temperature has been reached, wiping up spills of water, etc.), as well as high cleaning and operating costs. Furthermore, opening the lid several times entails a permanent temperature loss or a continuous change of temperature and water content, which individually and in combination with an increased deposit of water on account of the water bath leads to a rapid loss in quality of the meals.

SUMMARY OF THE INVENTION

It is an object of the invention to provide a heat retention system that is simple to operate, efficiently keeps meals warm, reacts quickly to temperature and possibly also climatic changes, has low operating costs and offers comprehensive possibilities with regard to the use of the heat retention system. The system is to be able to be used combined with keeping warm, serving and presenting meals (chafing dish concept).

The heat retention system for meals is based on inductive heat production. The heat retention system is constructed such that an undesired cooking of meals is avoided in a directed manner. At the same time, the heat in a directed manner is produced where it is required. Energy losses are largely avoided which leads to the fact that the heat retention system according to the invention has very low operating costs. A preferably modular construction of a heat retention system formed as a heat retention device furthermore permits a simple and compact construction, as well as a comprehensive usability of the heat retention system and combination possibilities of individual modules.

The heat retention system has a comparatively low thermal inertia so that temperature changes may be very quickly adapted or equalised. An active control of the temperature of the meals to be kept warm is made possible by way of suitably attached sensors. The sensors are preferably attached as close as possible to the meals such that a temperature change is determined without a negative delay. Preferably, via a control loop as a control unit the heating output is controlled.

Measurements of the relevant parameters of the meals are determined directly or indirectly. With a direct measurement the sensor is in directly connection with the object material to be measured. With an indirect measurement, secondary variables such as infra-red radiation or humidity, etc. are measured. By way of detecting the relevant parameters, dependent on the region of application, it is possible to retain the meals with a minimum loss of quality.

The heat retention system contains at least one active and one passive element for producing induced heat. As an active element there is preferably applied an induction coil which cooperates with a passive element. The passive element contains preferably material with ferromagnetic properties. Iron, nickel and cobalt containing materials as well as Heusler's alloys (ferro-magnetic alloys whose individual components are not ferro-magnetic) are particularly suitable.

The passive element is preferably combined in or with a receptacle for meals, such as a ceramic or glass pan with integrated or attached ferro-magnetic means, in the form of a foil or other elements. The receptacles may also completely or at least partly consist of ferro-magnetic material. By way of a suitable arrangement of the ferro-magnetic material the heat is distributed in a directed manner or is produced where it is optimally required. As receptacles flat dishes are particularly suitable. The receptacles for receiving the meals preferably have dimensions that are compatible with the standards usual for catering (catering standards).

The active elements are preferably integrated with a device, e.g. as stand, which are suitable for receiving one or more receptacles with passive elements. The device is advantageously configured such that one or more receptacles of a differing size and configuration may be combined with the device. The device is configured such that the active elements and the passive elements are interactively connectable, in that e.g. the receptacle or receptacles for receiving the meals is/are placed onto the device.

The device with the active elements for producing heat preferably comprises a plate that is transparent to an induced field. The plate may, for example, consist of a ceramic material (ceramic plate) and is arranged and designed such that one or more receptacles may be placed thereon. Below the plate there are arranged one or more active elements, e.g. in the form of a coil that serves for the thermal excitation of passive elements. With several active elements these are arranged such that each covers a certain part region of the plate. With a larger device, e.g. two, four or six coils may be arranged in one or two rows below the plate. Thermal sensors may be arranged in the middle of the coils, directly below the plate such that they detect the temperature of the meals as reliably as possible. Each coil is preferably activated individually such that the heating output for each receptacle may be controlled individually. If only one receptacle stands on the plate and does not cover the whole plate it is furthermore possible for only the coils that are covered to be activated.

The arrangement of the coils corresponds advantageously to the size of the receptacles in particular to the standards usual in catering and to the arrangement or arrangements of the receptacles to be heated. By way of the active control it is possible to control whether a coil is occupied or not. For example by way of a measurement of the temperature change or the heating output one may prevent wrongly occupied or unoccupied coils from being provided with heating power.

The device according to the invention is designed such that an undesired cooking procedure of the meals is prevented. The control of the energy supply is effected by "inquiry" of the temperature measured at the temperature probes by way of a microprocessor. The supply of energy into the active induction means is controlled such that meals are kept warm in that a set temperature is held constant by way of an electronic control of the temperature probes. Moreover, there is installed a safety protection against overheating which effects an automatic interruption of the supply of energy, for example when there is measured a temperature gradient which is too great, e.g. near to the surface of the active elements. The control of the energy supply by way of temperature probes attached as optimally as possible leads to a very short reaction time of the system. This is important since the temperature change in the foodstuffs is largely prevented. As a result of this, large temperature fluctuations do not occur and the loss in quality of the meals, which this entails, may be avoided. The power or temperature limitation is designed such that meals are held at an optimal heat retention temperature according to experience in the region between e.g. 60° C. and 85° C. Regeneration processes, e.g. cooking processes during the presentation and the changes of the foodstuffs, which this entails, are prevented in a directed manner, in contrast to a system that serves for processing foodstuffs (e.g. catering method).

The plate for receiving the receptacle preferably comprises means (e.g. in the form of deepenings), which are interactively connectable to corresponding counter means on the receptacles (e.g. in the form of elevations), when the receptacles are placed onto the plate. The means are designed such that the receptacles are secured against undesired lateral displacement. By way of this it is possible to create meals without the receptacles in which the meals are located from displacing.

The device may be designed as a serving table or as an installation variant, e.g. for installation into a surface (buffet). It is advantageously configured such that the meals may be covered by way of a covering. The covering may, for example, be designed as a lid mounted on a hinge. The covering may be in interactive connection with the control for the heating power such that an opening of the covering leads directly to an adaptation of the heating power before other sensors register a change. This may be realised by way of a switch cooperating with the covering. Electronics present immediately recognise when the heat retention apparatus is opened and may begin with a minimal supply of energy into the active elements before a temperature probe has measured a reduced temperature. This leads to an extremely short reaction time of the heat retention system and accordingly small temperature fluctuations in the foodstuffs. The covering may additionally be provided with climate openings that permit a water content exchange to the surroundings and ensure an optimal water-content climate of the meals.

A temperature probe may, for example, also be accommodated in a receptacle for receiving meals, e.g. in a pan and be activated inductively by the electronics. This offers the advantage that the temperature measurement in this manner is even closer to the object to be measured.

A safety measure in the heat retention system according to the invention is a preferably electronically controlled "variable recognition" of passive elements. Only when passive elements on a certain surface, for example are covered by a pan does the apparatus permit the switching-on of the active element or elements, i.e. the energy supply into the active elements. The recognition of passive elements leads to the fact that active elements that are not occupied are not supplied with energy, by which means energy is saved and additional safety is offered. By way of the very efficient heating system the energy consumption of the heat retention system is kept low so that the running costs during operation are limited to a minimum.

A mounting is preferably a stand with a lid. The lid may be manufactured or coated of metal or for the improved heat insulation of insulating material or heat reflecting material. If the lid is completely or partly manufactured of a suitable, transparent material, e.g. glass, for example double-lazed and/or coated for minimising condensation water formation, this offers the advantage that the meals located in the receptacle comprising the passive element may be observed without the opening of the lid becoming necessary.

The plate for receiving the receptacles is preferably a ceramic plate. The size of the plate is advantageously adapted to the size of dishes according to the catering standard (GN). Preferably the ceramic plate is planar. In the case that the ceramic plate however comprises means for arresting the dishes, the arresting means preferably are likewise adapted to the standards of passive heat elements, e.g. base distances of GN pans or the width of the pans.

A receptacle that comprises at least one passive element consists preferably of a pan equipped with or without a lid, e.g. a ceramic pan with attached or integrated passive elements for example in the form of a ferro-magnetic foil or other means. By way of a suitable arrangement of the passive elements the heat is distributed in a directed manner or is produced where it is required. A foil spread out on the underside of a pan or incorporated in the underside of the pan may, for example, be provided with reliefs, wherein the distribution of the reliefs may be selected according to requirement. One possibility is also an insulating pan, which in its interior comprises heat-conducting elements, e.g. a heat-conducting layer that may be identical to the passive element and which extends up to the edge regions of the pan. The heat produced in the passive elements via the conducting layer gets to up into the edge regions of the pan. This ensures an even better and more uniform heat distribution in the foodstuffs.

Preferably there are applied pans with various standard sizes, special catering standards, e.g. 1/1, 1/2, 1/3, 2/3, corresponding to the size of the ceramic plate, so that they may be combined in a comprehensive manner and may be arranged on the ceramic plate in a manner which is as space-saving as possible. A receptacle of insulating material offers the advantage that little heat is lost. However, as already mentioned, differently shaped pans of other materials may be used.

In a preferred embodiment the heat retention system according to the invention is designed as a heat retention device that has a modular construction. This consists essentially of an energy part and, if required, of a mounting and a covering. The energy part is preferably a module configured as a control unit that contains inducing elements usable for inductive heating, their control and energy supply as well as any occurring sensor control. It is preferably configured as the above mentioned device. Preferably a further module is configured as a mounting in which a control unit is held. Onto the control unit there may be placed receptacles that contain passive elements for the inductive production of heat. The receptacles, e.g. pans, are preferably covered with a further module configured as a covering. The covering may be rigidly connected to another module, for example to a mounting.

Individual modules are configured such that the heat retention device may preferably be rapidly disassembled and reassembled without the application of tools. For this, individual modules are fastened to one another via fastening means, preferably via acting and counter means, such that the individual modules may be simply connected to one another and again separated from one another. All fastening means are preferably configured such that they have as simple a shape as possible. Examples for active and counter means are positive-fit fastening means, for example form-outs such as projection or pins and reliefs corresponding to these such as grooves and holes. Further active and counter means are turnbuckles or locking bars with which individual modules may be fastened to one another and connected to one another. A connection of modules is then created by way of closing a clamping device or locking a locking bar, for example by rotation. The individual modules are preferably constructed simply and compactly and are preferably configured such that they permit a simple cleaning and are usable and combinable in a comprehensive manner.

By way of the modular construction individual modules may be used in a comprehensive manner. According to requirement they may be omitted, replaced or for example removed for cleaning.

In a preferred embodiment of the heat retention system according to the invention a module configured as a control unit is applied into a stand. According to the configuration of the stand, the heat retention device may be used as a serving variant or as a free-standing individual apparatus. As a serving variant a simple mounting is also suitable, for example in the form of a table-like construction with a frame into which the control unit is applied. A module for the simple connection to further modules and in order in the connected condition to be stabilised may comprise guide and stabilisation means. These are preferably directly integrated into the fastening means but may also be designed as additional means, for example as laterally attached vertical or horizontal rails. In order to be able to hold individual modules better, they are preferably equipped with holding means, e.g. grips or reliefs. The guide and holding means are according to requirement designed as units that may be sunk in the module.

A mounting for a control unit may also be a suitable relief with suitable fastening means in a surface, for example, a surface of a buffet or installed kitchen. Thus, the same control unit may be used in a kitchen, and subsequently be transported into a dining room and placed into an available mounting. This is, above all, advantageous for smaller firms that do not have several heat retention devices.

A mounting comprises preferably a covering in the form of a lid that likewise as a module may be attached and again removed. The lid for this comprises laterally attached cylindrical form-outs. The fastening means and the mounting are preferably configured such that the lid in the opened condition at least partly may be sunk in the mounting (so-called roll-top).

A modular construction apart from a simplified cleaning and comprehensive application possibility also offers a generally simpler handling and an increased mobility of the heat retention device. Individual modules may without problem be handled and carried by an individual person so that the modules or the whole heat retention system may be easily moved from one location to another. For this individual modules are removed by simple release of the positive-fit fastening means or otherwise after prior opening of turnbuckles or bars. The modular construction also offers advantages in manufacture. Individual modules may thus be manufactured by different companies, wherein the modules as well as replacement modules may be combined with existing modules directly by the end consumer. The size of the modules as well as the fastening means are preferably standardized so that, for example, other control units such as units heatable electrically or with gas may be combined with an existing mounting.

A module as a control unit is preferably configured such that it forms an individual housing, which preferably contains active elements, e.g. induction coils, the supply necessary for this, e.g. generators, as well as a surface permeable to an electromagnetically inducing field, for example a ceramic plate. Furthermore, in the control unit preferably there are also accommodated the whole electronics such as the regulation and control of the energy supply into the active elements, the monitor of the sensors as well as the switch elements. Since active elements are preferably activatable individually and one generator per active element would be too expensive and too complicated, a single generator is connected to the active elements such that individual elements may be heated one after the other over a certain period of time. The complete control unit is furthermore configured such that it, by way of fastening means and any present guide and holding means, may be brought into a mounting and be removed therefrom. The current supply for a generator at the same time is attached such that any cable attached to a control unit may be attached and removed where possible just after the installation or before dismantling the unit, and an attachment of the cable is also possible when the unit is not located in any mounting. It is also possible to fixedly mount the actual current supply, for example the cable connection to or in a mounting and to configure the mounting as well as the control unit so that on construction of the modules an electrical contact arises by way of connecting contact means on the modules.

Individual parts or elements of the modules may also be configured as sub-modules such that they, when required, may be attached and removed quickly and simply. Examples for such parts or elements are grips or a generator that in the form of a sub-module may be removed from a control unit and used in another manner.

The individual modules, in particular a control unit as well as the receptacles that may be used therewith preferably have dimensions that are compatible with standards usual in catering (catering standards, or correspond to such standards). A control unit is at the same time advantageously designed such that one or more receptacles of differing size and shaping are simultaneously combinable with the unit.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
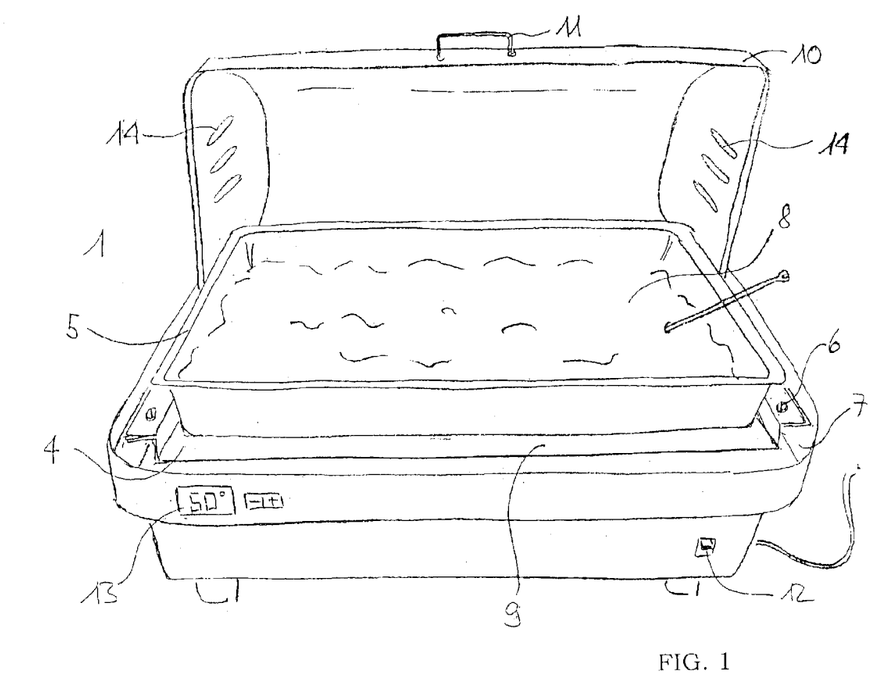
FIG. 1 is a schematic representation of a heat retention system according to the invention.

FIG. 1 shows schematically and greatly simplified a heat retention system 1 according to the invention. The shown embodiment contains active and passive elements 2, 3, which are accommodated in a device 4 or in a ceramic pan 5. The device 4 furthermore comprises fastening means 6, e.g. screws, by way of which they are installed into a mounting 7, e.g. a stand. The active elements 2, e.g. induction coils, cooperate with the passive elements 3 of the ceramic pan 5. The electromagnetic energy induced in this manner in the passive element is converted into heat and serves for heating the foodstuffs 8 located in the pan 5. Furthermore, the heat retention system 1 according to the invention contains a ceramic plate 9 preferably a planar ceramic plate onto which the pan 5 is placed. The stand 7 additionally comprises a lid 10 with a hand grip 11, wherein the lid 10 is connected to the stand 7. The lid 10 is preferably attached such that when in the closed condition covers the device 4 and the pan 5 and when in the open or partly open condition at least partly may be sunk in the stand 7 (so-called roll-top). The meals 8 in the ceramic pan 5 are thus covered and protected from heat and moisture loss. In the lid there may be provided openings 14 which prevent an excess collection of condensation water and thus ensure an optimal water-content climate of the meals. In the shown example these openings are laterally directed. Additionally, the heat retention system 1 comprises switches 12 and display means 13 which, for example, serve for switching on the apparatus, for switching between different, preferably two power steps and for displaying the temperature. The display means 13 may also be configured as a simple light display: as soon as the apparatus is switched on and is ready for operation, e.g. a small lamp begins to shine. With the light display there is preferably combined a nil return procedure. For example, by way of a different number of flashing impulses, durations or intervals there is indicated the type of error, e.g. no coil current, a too high temperature, etc. According to the type of error the supply of energy into the induction means is completely interrupted, or the heat retention system functions further with a reduced power, e.g. 60% in a cycled operation. The stand 7 is preferably manufactured of CrNi steel, wherein the holding grip 11 of the lid 10 and other individual parts may have different material, e.g. polished stainless steel or brass. Furthermore the device 4 may also be welded into the mounting 7.

Figure 2:
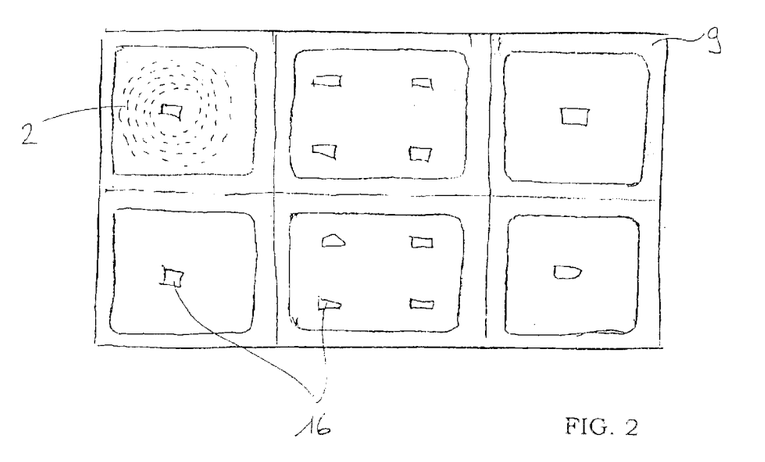
FIG. 2 is a plan view of arrangements of active elements.

FIG. 2 shows a plan view of the plate 9 in FIG. 1. The plate 9 here consists of ceramic, e.g. ceramic plate, which for the induced field is transparent and further comprises Induction coils 2 arranged underneath, which here serve as active elements and are arranged in two rows. In the middle of each induction coil 2 there are to be recognised one or more temperature probes 16, which serve for the control of the temperature.

Figure 3:
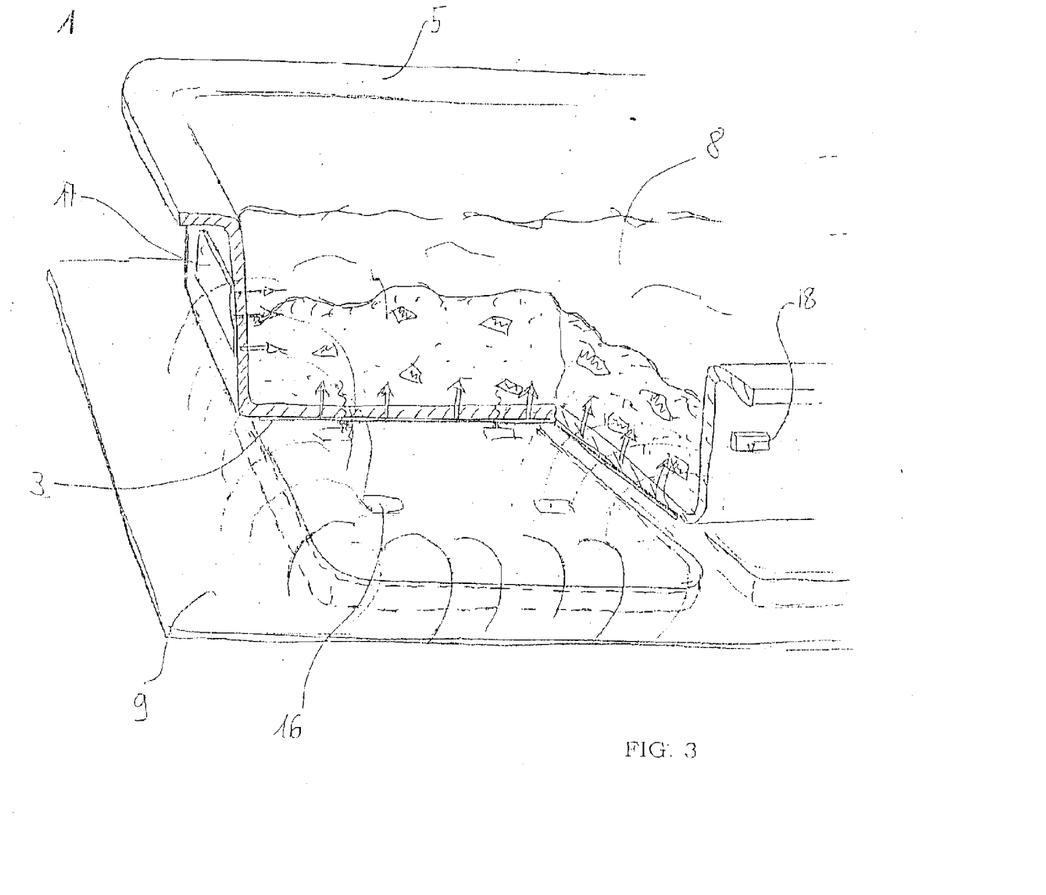
FIG. 3 is a sectioned representation through a part of a heat retention system.

FIG. 3 shows a cut-out of the heat retention system 1 according to FIG. 1 in a perspective sectioned representation. For an improved understanding the ceramic pan 5 is shown sectioned. One may recognise the interactive connection of active and passive 3 elements in combination with temperature probes 16. The pan 5 filled with meals comprises a foil 3 which here serves as a passive element. The foil 3 is attached to the lower side of the pan 5 and is heated by the induction coils 2 attached below the plate 9, by way of induced eddy currents. The foil 3 may also be attached in the interior of the pan 5 in order to achieve a direct heating of the meals 8.

A further metal foil 17 serves as a further passive element. The metal foil 17 is here, by way of example, attached laterally to the pan 5 and serves for the local production of heat. As may be recognised with the invention disclosed here heat may be produced at directed locations. Where required the condition of the meals may be measured by a temperature probe 18, which for example, is attached on one side of the pan 5. Devices like these permit a very uniform heat distribution into the meals 8 and also such a monitoring or control.

Figure 4:
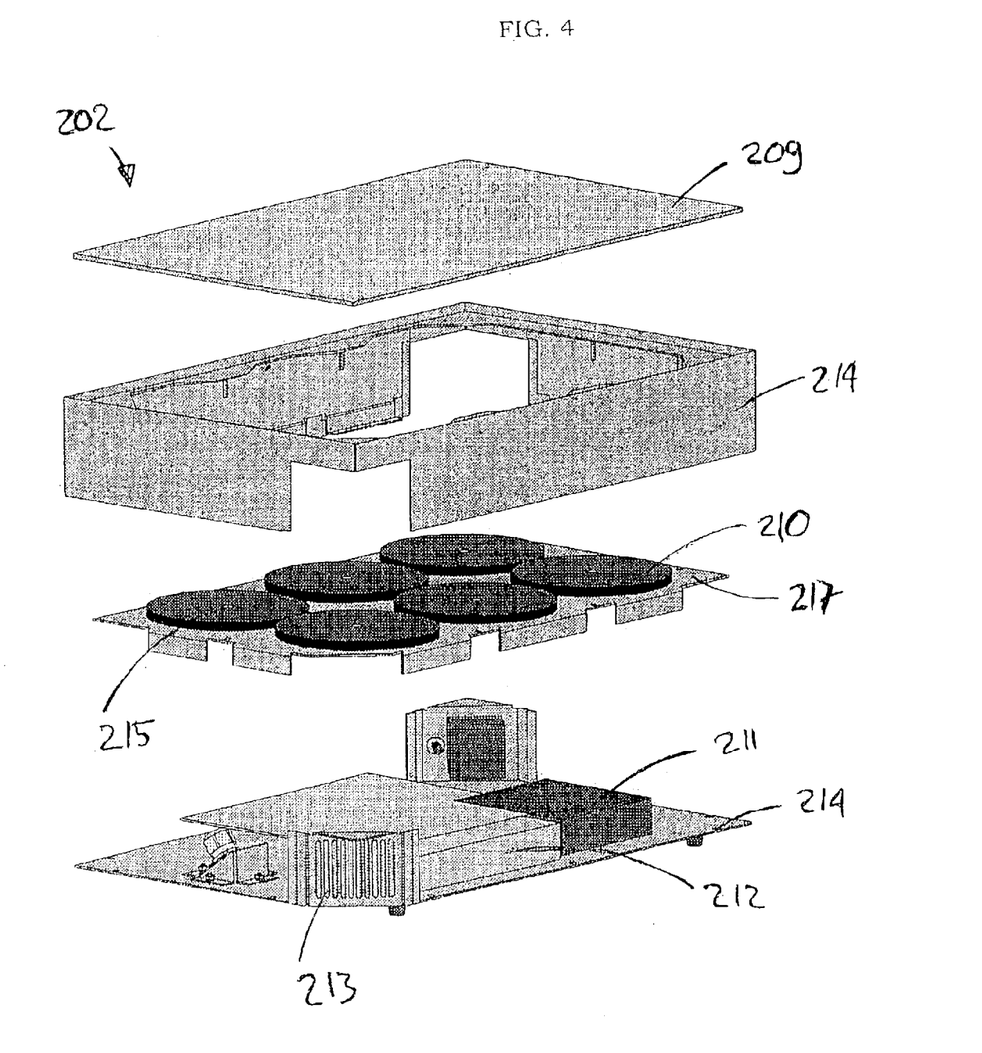
FIG. 4 is an exploded representation of a heat retention system.

FIG. 4 shows an exploded representation of a device 202 according to the invention. The device 202 contains a smooth, electrically insulating plate 209, preferably a ceramic plate. Below the ceramic plate 209 there is assembled a carrier 217 on which there are arranged six induction coils 210 in two rows of three coils. All parts including a generator 211 and electronics 212 serving as a control circuit or control unit are accommodated in the housing 214 preferably provided with an aeration opening 213. Additionally, in the middle of each coil 210 there are located temperature probes 215 via which the temperature of the cooked product 8 is ascertained and thus the control of the energy supply into the induction coils 210 is controlled. The temperature probes 215 are for this purpose connected to the electronics 212. Preferably in the device 202 there are incorporated switch means, which permit the setting between two power stages and thus temperatures, preferably 70° C. and 85° C. The power is in one preferred embodiment form limited to 600 W and is distributed to the induction coils 210, wherein preferably only occupied coils are supplied with current. At the same time the supply of energy is controlled by the electronics such that the temperature of the foodstuffs 8 in a ceramic pan 5 is held constant. An overheating protection, e.g. the control of the temperature gradient at the temperature probes 215 ensures an automatic interruption of the energy supply into the induction coils 210 in the case that a certain limit value of the temperature gradient is exceeded. The protection may be configured such that the apparatus, after cooling to the operating temperature, automatically is switched on again, or that the apparatus after the cooling process must be actively started again. For the additional security or to save energy in the device 202 there is located a "dish recognition" which recognises the size of the ceramic pan 5 located on the ceramic plate 9. This is effected preferably via a resistance measurement via the induction coils 210 or via an induction loop which is attached to the pan 5. The recognition is effected in a manner such that a certain surface of the ceramic plate 209, e.g. at least two coils 210 must be covered by pans 5 so that the "dish recognition" connected to the electronics 212 releases the energy supply into the induction coils 210. Coils 210 that are not covered accordingly are not supplied with current. The ceramic plate 209 and the induction coils 210 lying thereunder are specially directed to the catering standard, i.e. the size of the ceramic plate 9 or the arrangement of the coils 210 is conceived such that it is compatible with standard pans 5. A pan then covers one, two, four or six coils 210, wherein the pans according to their size may be arranged In any manner on the ceramic plate 209. Furthermore, on or in the housing 214 there is attached a housing temperature sensor, which monitors the temperature in the inside of the device 202, e.g. a cooling plating. The power of the heat retention system is reduced or interrupted as soon as this temperature exceeds a certain limit value, e.g. 65° C. The housing temperature sensor may also be used for controlling aeration, e.g. the switching on and off of a ventilator.

Figure 5:
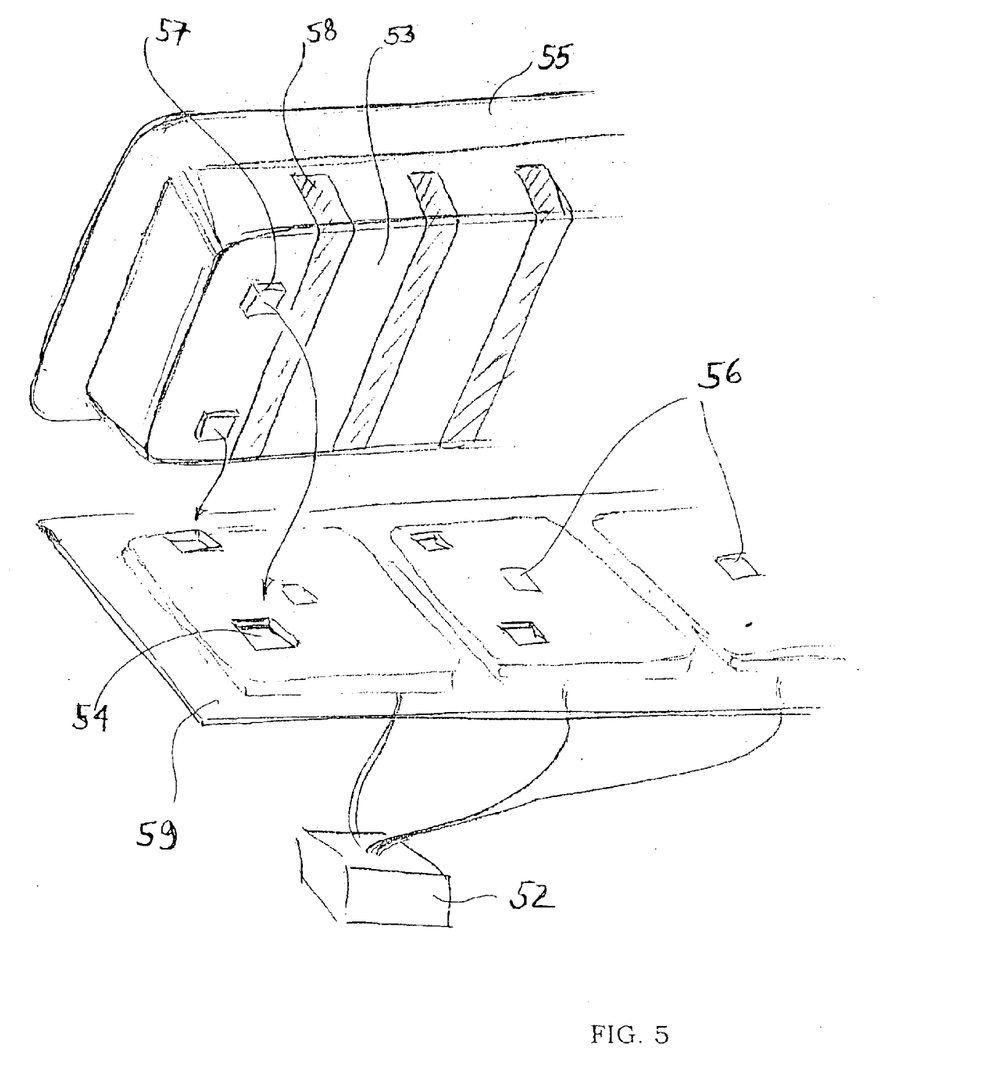
FIG. 5 is a perspective representation of active and passive parts.

FIG. 5 shows the underside of the ceramic pan 55 and a ceramic plate 59 of a heat retention system. The pan 55 comprises a passive element 53 and heat-conducting strips 58 that come into contact with temperature probes 56 as soon as the ceramic pan 55 is placed on the ceramic plate 59. The complete supply of energy is controlled and regulated via a control 52 connected to the temperature probes 56 and induction coils. The device comprises corresponding arresting means 54 and 57, which prevent a lateral displacement of the pan 55 with respect to the plate 69. The arresting means are projections 57 on the underside of the pan 55 which correspond to reliefs 54 in the ceramic plate 59. The distances of the projections 57 or of the reliefs 54 as with the size of the ceramic pan 55 preferably correspond to a catering standard, which has various standard sizes. The ceramic plate 59 is accordingly designed so that the pans 55 whose sizes e.g. correspond to 1/1 1/2, 1/3, 1/6 of the ceramic plate 59 may be arranged on the plate combined in a comprehensive manner and in a space saving manner.

Figure 6:
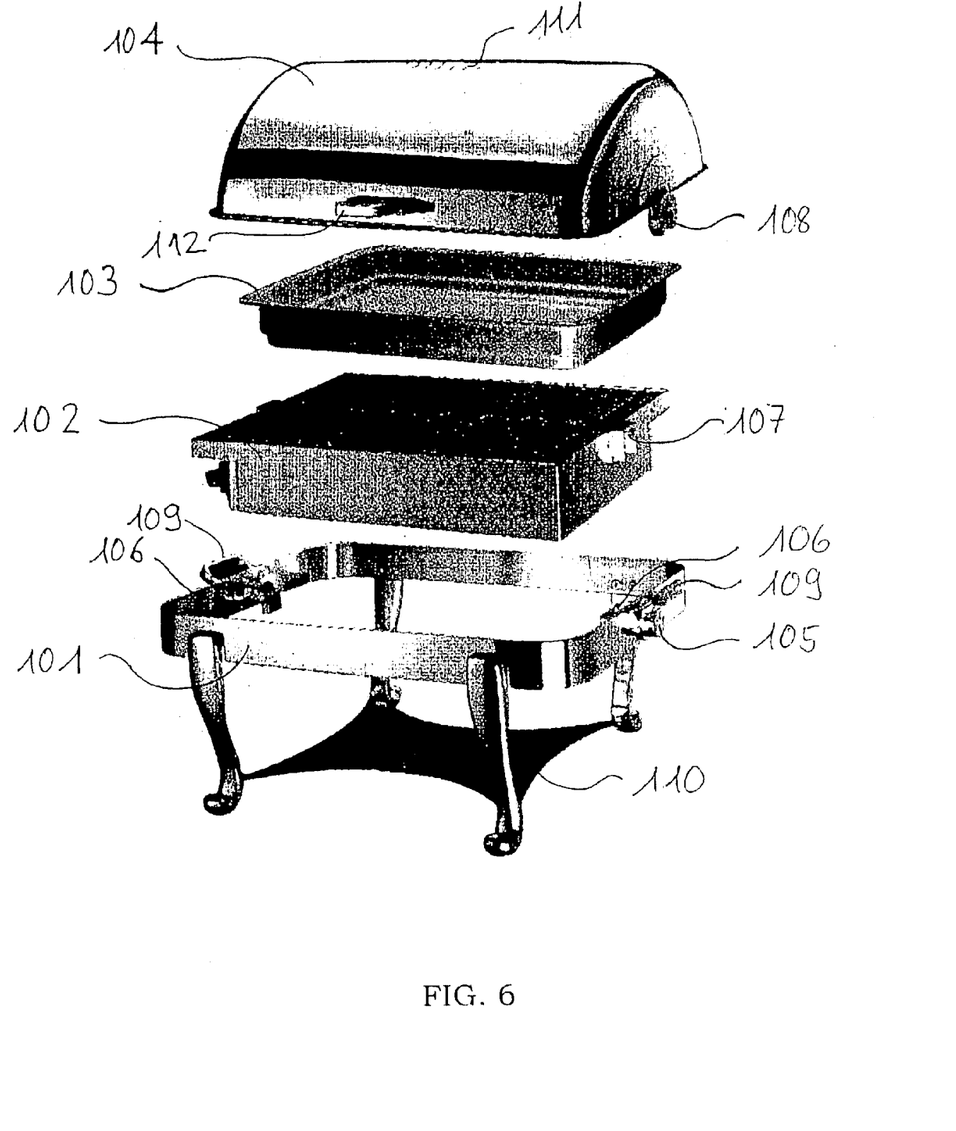
FIG. 6 is a representation of a heat retention device according to the invention as a modularly constructed heat retention device.

FIG. 6 represents a simplified embodiment form of a modularly constructed heat retention device. The shown embodiment contains four modules 101–104, which may be connected to one another and again separated from one another by way of fastening means 105–108. A control unit 102 comprises fastening means in the form of laterally attached U-shaped form-outs 107, which correspond to first fastening means in the form of laterally flattened cylinders 106 of a stand 101. The fastening means 106, 107 are attached such that the control unit after incorporation into the stand 101 preferably lies on the first fastening means 106 of the stand 101. For this the U-shaped form-outs 107 of the control unit 102 are attached on the outside on the unit 102 in a manner such that the U is open to the bottom. The U-shaped form-outs 106 of the stand 101 are accordingly incorporated laterally internally in the middle on the stand 101. The sides of the U-shaped form-out 107 serve, on the one hand, as a guide for the control unit 102 for introduction into the stand 101 and, one the other hand, for stabilising, i.e. for preventing the unit 102 from slipping in the stand 101.

The control unit 102 contains active elements usable for the inductive heating such as induction coils, a generator as well as electronics and switch means, with which the unit may be switched on and off as well as preferably selectable between two different power stages of the unit. The control unit 102 may thus as an individual module be removed from the stand as a fully functionable unit and may be incorporated into a kitchen combination or a buffet. For this the kitchen combination or a buffet has a suitably large relief and corresponding fastening means.

The stand 101 comprises additional second fastening means 105, which correspond to fastening means 108 of a lid 104 with which a receptacle 103 containing the meals may be covered. The second fastening means 105, the corresponding fastening means 108 of the lid 104 as well as the configuration of the stand 101 are conceived such that the lid 104 may be closed and opened by way of the fastening means 105, 108 and at least may be partly sunk in the stand 101. The stand 101 for this comprises two laterally externally attached form-outs 105 that are essentially cylindrical. The fastening means of the lid 104 corresponding to this, which preferably are attached laterally externally projecting downwards, are essentially slotted rings 108 or slotted hollow cylinders. The slots are preferably selected so large that the rings 108 or hollow cylinders with the slots may be guided over the second fastening means 105 of the stand 101. It is also possible for the lid 104 with a certain elasticity of the lid material to be guided at the outside over the two fastening means 105, and the rings 108 or hollow cylinder lock as soon as they are fully over the cylindrical form-outs 105 of the stand 101. The cylindrical form-outs 105 are preferably flattened on one side in order to limit the movement of the guided-around ring 108.

It is further possible to provide the fastening means of a mounting or of a lid with a rotating joint so that the fastening means may for example be plug-like form-outs.

The stand 101 for an improved handling and stability is provided with grips 109 and an under-plate 110. The under-plate 110 prevents the bending of the stand 101 and simultaneously offers an additional rest surface, e.g. for cutlery or serviettes. The stand 101 may also comprise rollers, which are preferably arrestable.

Attached to the lid 104 there are incorporated a grip 112 and openings 111. The openings are in this embodiment shaped as slots and serve for the water-content regulation of the meals below the lid 104. Such lid openings 111 are preferably closable.

According to the size or height of the stand 101 the heat retention device may be selected as a serving variant to be placed on a table or onto a buffet or also as a free-standing individual device, for example next to a table or buffet.

Figure 7:
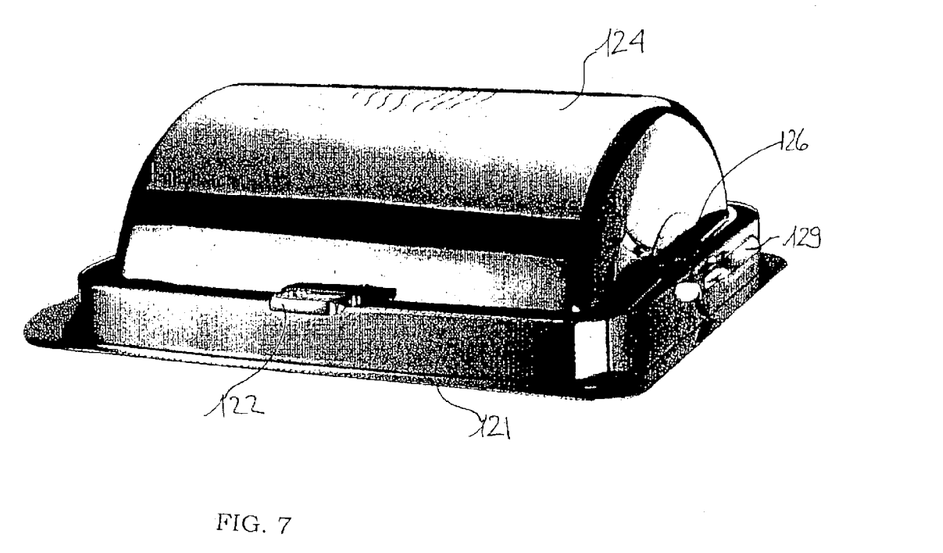
FIG. 7 is a representation of a further modularly constructed heat retention device.

One embodiment of the device according to the invention as is shown in FIG. 6 has preferably rough dimensions of 770×475×425 mm (width x depth x height), wherein the height with an embodiment example according to FIG. 7 is smaller and preferably is about 225 mm. From the description it is deduced however that theoretically there are no limitations as to the size.

FIG. 7 shows a heat retention device in a simple serving variant. The mounting is a tabular plate with a frame 121, which comprises grips 129 and fastening means 126 attached on the inner side for a control unit, as well as for a lid 124. The frame 121 and the lid 124 are configured such that the lid 124 with a grip 122 fastened on it may be guided along the fastening means 126. The frame height is configured such that at least a partial opening and sinking of the lid 124 in the frame is made possible. In a low designed serving variant the lid 124 is preferably at the front and rear provided with a grip 122 in order to be comfortably attached and removed. The flat embodiment form of the serving variant shown in this figure permits a problem-free use of the control unit including the lid 124, for example as an installation variant in a plate of a kitchen fitting or in a buffet.

Figure 8A:
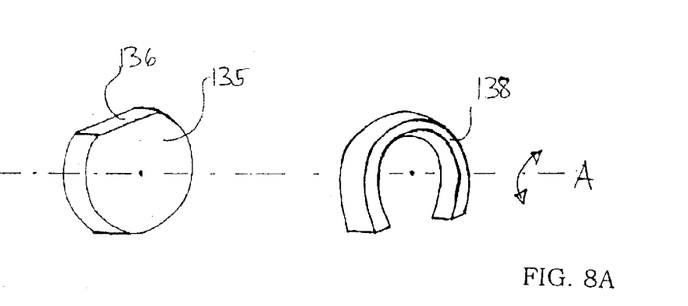
FIGS. 8*a*, 8*b* show exemplary fastening means.
Figure 8B:
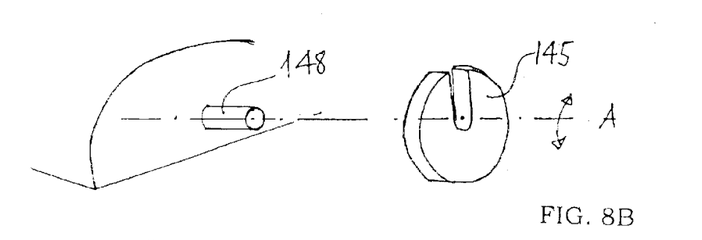

In the FIGS. 8a and 8b there are shown in each case two pairs of corresponding fastening means for individual modules. Both pairs are characterised in that they, after they have been connected to one another, may be rotated about a common axis A. In FIG. 8a the fastening means are shaped cylindrically 135 or in with a hollow-cylindrical shape 138. In order to be able to displace the fastening means 135, 138 in the same plane over one another, the hollow cylinder 138 is accordingly slotted. The fastening means 135, 138 may comprise arresting devices which limit a rotational movement. This is represented in the fastening means 135 as a flattening of the cylinder 135. A hollow-cylindrical shaped fastening means then comprises suitable corresponding form-outs, for example likewise flattenings.

In FIG. 8b there is shown a fastening means in the form of a simple cylinder 148 which for example is fastened to a lid. A corresponding fastening means on a mounting is then for example a slotted disk 145 or a slotted hollow cylinder.

The fastening means 135, 138, 145, 148 are preferably configured such that they may lock. For this the slot of the disk 145 through which the cylinder is guided may be slightly narrowed or the slotted hollow cylinder 138 at least elastic in a limited manner so that the ends of the hollow cylinder 138 extend up to over the middle of the cylinder 135.

Figure 9A:
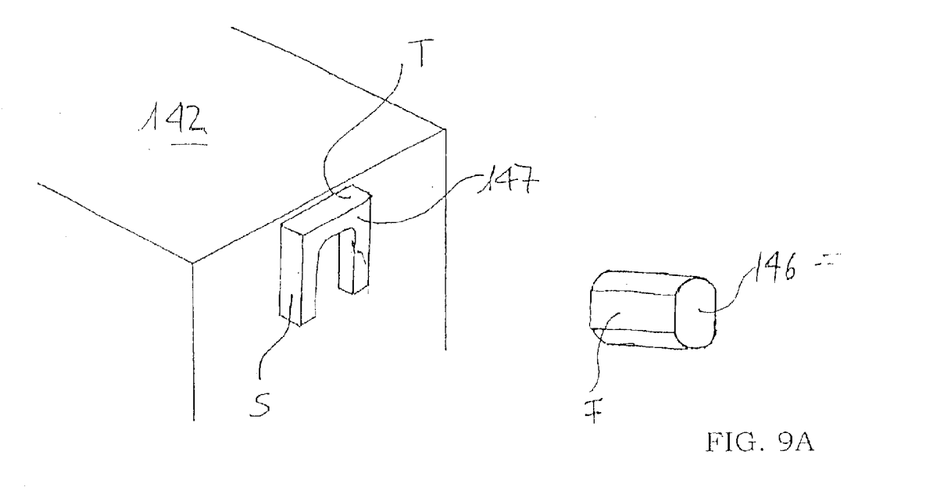
FIGS. 9*a*, 9*b* show further fastening means
Figure 9B:
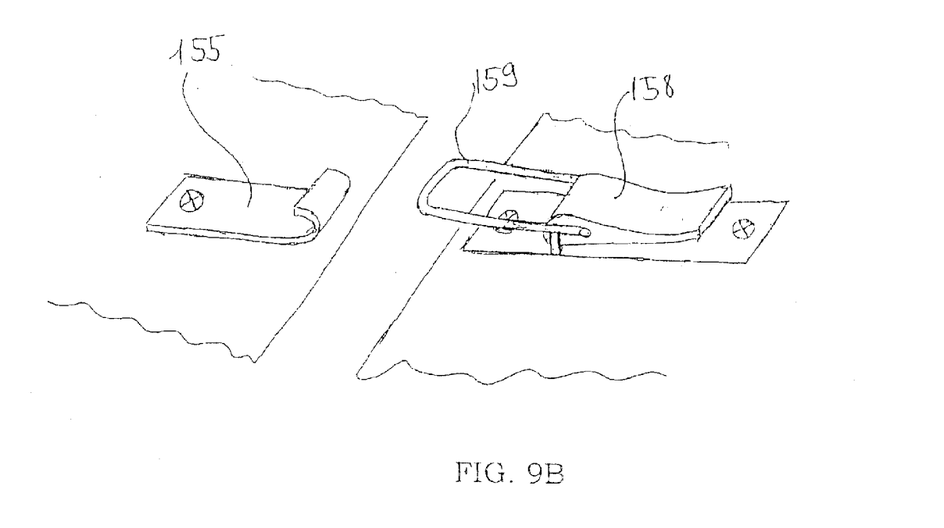

In FIGS. 9a and 9b there are shown fastening means which preferably are attached to modules that are not to be mutually rotated as for example a control unit and a mounting. The U-shaped fastening means 147 to be seen in FIG. 9a is placed on the laterally cut-away cylinder 146, wherein a module 142 equipped with the fastening means 147 with the web T bears on the cylinder 146 and by way of the sides S of the U, as well as by way of the flattening F on the cylinder 146 is secured against laterally tipping-over. The cylinder 146 may also be configured as a simple cube or as a rectangular parallelepiped. In FIG. 9b there is shown a fastening means in the form of a turnbuckle. A hook-like fastening element 155 is located for this for example on a lid whist the clamping device 158 is for example fastened on a stand. Also this form of a fastening means may be very simply without further auxiliary means be closed and again opened by one person.

What is claimed is:

1. A heat retention system for keeping meals warm, said system comprising: a heat retention device (4, 202) and at least one receptacle (5, 55, 103) for accommodating meals, said device being adapted to accommodate said at least one receptacle and containing a control unit (102, 212), a plate (9, 59, 209) for supporting the at least one receptacle, a plurality of active elements (2, 210) and a plurality of temperature sensors (16, 18, 56, 215) disposed on or in the plate, wherein one of the temperature sensors is allocated to each of the active elements, each of said at least one receptacle comprising at least one passive, inductively heatable element (3, 53) and said at least one receptacle (5, 55, 103), individually or collectively, may be brought into interactive connection with the device (4, 202) such that each of said at least one receptacle (5, 55, 103) is heatable by way of the at least one passive, inductively heatable element (3, 53) as a result of induction by way of one or more of the active elements (2, 210) of the device, wherein the temperature of the at least one receptacle (5, 55, 103) may be kept to a settable value by way of one or more of the temperature sensors (16, 18, 56, 216) and the control unit (102, 212) independently of the extent of filling, wherein the device is adapted to accommodate different sets of dimensions for each of the at least one receptacle, such that when each of the at least one receptacle has a first set of dimensions, each of the at least one receptacle covers a plurality of the active elements;

wherein the heat retention device consists of several modules (101, 102, 104, 121, 124, 142), said modules (101, 102, 104, 121, 124, 142) comprising fastening means (105–108, 126, 135, 138, 145–148, 155, 158) in the form of active and counter means for the releasable connection of the individual modules (101, 102, 104, 121, 124, 142); and wherein one module is a covering (104, 124), a second module is a control module, and a third module is a mounting.

2. The heat retention system according to claim 1, wherein the at least one active element (2, 210) is an induction coil.

3. The heat retention system according to claim 2, wherein at least one of the sensors (16, 18, 56, 215) is located in a middle of one of the induction coils (2, 210).

4. The heat retention system according to claim 1, wherein the active elements (2, 210) are individually controllable.

5. The heat retention system according to claim 1, further comprising sensor means for recognising which of the active elements (2, 210) are actively connected to passive elements (3,53).

6. The heat retention system according to claim 5, wherein only those active elements (2, 210) that are actively connected to passive elements (3, 53) are supplied with energy.

7. The heat retention system according to claim 1, wherein the plate (9, 59, 209) is a ceramic plate.

8. The heat retention system according to claim 1, further comprising switch means (12) for switching between different power stages, wherein a temperature is allocated to each power stage and wherein, by way of the control unit (102, 212), the energy supply to the active elements may be reduced when the temperature of the meals (8) rises to a temperature above the temperature allocated to the power stage.

9. The heat retention system according to claim 8, wherein, via the control unit (102, 212), temperatures in a range of 60° C. to 85° C. may be set.

10. The heat retention system according to claim 1, wherein at least one of the receptacles (5, 55, 103) is a ceramic pan.

11. The heat retention system according to claim 10, wherein the passive element (3, 53) of the ceramic pan (5, 55) is a ferro-magnetic foil.

12. The heat retention system according to claim 1, wherein the active elements (2, 210) are individually controllable and only those active elements (2, 210) that are actively connected to passive elements (3, 53) are supplied with energy, and wherein the system comprises at least one temperature probe, the at least one temperature probe is attached on or in a plate (9, 59, 209) on which receptacles may be arranged and wherein, by way of the control unit (102, 212), the energy supply to the active elements may be varied when the temperature obtained by the temperature probe rises to a temperature below or above the temperature allocated to the power stage.

13. A method for keeping meals warm using the heat retention system according to claim 1, wherein meals (8) are kept warm by way of inductive energy transmission from at least one of the active elements (2, 210) into the at least one passive element (3, 53), wherein the temperature of the meals (8) directly or indirectly is measured and controlled by way of one of the temperature sensors (16, 18, 56, 215) and the control unit (102, 212), which is allocated to the at least one active element, and wherein by way of this a quick and efficient control of supplied energy into the at least one active element (2, 210) is possible and the temperature of the meals (8) is held at a settable temperature.

14. The method for keeping meals warm according to claim 13, wherein the energy supply into the at least one active element (2, 210) is interrupted as soon as this at least one active element (2, 210) is not actively connected to a passive element (3, 53).

15. The heat retention system according to claim 1, wherein one module is an energy part that serves for the inductive heating of said at least one receptacle (103).

16. The heat retention system according to claim 15, wherein the energy part is designed as a control module (102) and includes the active elements usable for inductive heating, the control unit and an energy supply.

17. The heat retention system according to claim 1, wherein one module is a mounting in the form of a stand (101), a tabular construction (121), or an installation surface.

18. The heat retention system according to claim 1, wherein the covering (104, 124) is provided with openings (111).

19. The heat retention system according to claim 1, wherein the active and counter means are positive fit fastening means (105–108, 126, 135, 138, 145–148) or turnbuckles (155, 158) or bars.

20. The heat retention system according to claim 19, wherein the positive-fit fastening means (105–108, 126, 135, 138, 145–148) are essentially U-shaped, cylinder-shaped or hollow cylinder shaped fastening means.

21. The heat retention device system according to claim 1, wherein the fastening means (105, 108, 126, 135, 138, 145, 148) permit the modules (101, 104, 121, 124) to be mutually rotated.

22. The heat retention system according to claim 1, wherein each of the at least one receptacle has dimensions compatible with catering standards.

23. A heat retention device for keeping meals warm by way of inductively produceable heat, said heat retention device comprising: a control unit (102, 212), a plurality of active elements (2, 210), a plate, and a plurality of temperature sensors (16, 18, 56, 215) allocated to the active elements, respectively, said temperature sensors being attached on or in said plate (9, 59, 209), wherein the dimensions of the plate as well as the arrangement of the active elements (2, 210) are in a manner to be combinable with inductively heatable receptacles in a space-saving way, which receptacles may have different dimensions, wherein one or more of the active elements (2, 210) are coverable by said receptacles, and wherein power into the active elements is controllable by way of the temperature sensors (16, 18, 56, 215) and the control unit (102, 212), and wherein the heat retention device is arranged in a plurality of modules that are releasably connectable together, said modules comprising a control module including the active elements and the control unit, and a cover module for disposal over the control module.

24. The heat retention device of claim 23, wherein said modules further comprise a stand module upon which the control module may be supported.

* * * * *